United States Patent
Nethery, III

(10) Patent No.: US 9,501,264 B2
(45) Date of Patent: Nov. 22, 2016

(54) USER CORRECTIONS IN TRANSLATION

(71) Applicant: Kee Stanton Nethery, III, Sabastapol, CA (US)

(72) Inventor: Kee Stanton Nethery, III, Sabastapol, CA (US)

(73) Assignee: TG LLC

( * ) Notice: Subject to any disclaimer, the term of this patent is extended or adjusted under 35 U.S.C. 154(b) by 0 days.

(21) Appl. No.: 14/477,842

(22) Filed: Sep. 4, 2014

(65) Prior Publication Data

US 2016/0070543 A1 Mar. 10, 2016

(51) Int. Cl.
*G06F 9/44* (2006.01)
*G06F 17/28* (2006.01)

(52) U.S. Cl.
CPC .............. *G06F 8/30* (2013.01); *G06F 17/2854* (2013.01)

(58) Field of Classification Search
CPC ........ G06F 17/2854; G06F 8/30; G06F 8/31; G06F 8/311
See application file for complete search history.

(56) References Cited

U.S. PATENT DOCUMENTS

| | | | | |
|---|---|---|---|---|
| 6,644,322 B2 * | 11/2003 | Webb | ................... | A61B 5/0031 128/899 |
| 8,479,154 B1 * | 7/2013 | Friedman | ................... | G06F 8/30 717/100 |
| 2003/0106047 A1 * | 6/2003 | Nakano | ................. | G06F 11/261 717/138 |
| 2003/0236657 A1 * | 12/2003 | Ryzl | ........................ | G06F 8/20 703/23 |
| 2004/0102956 A1 * | 5/2004 | Levin | ................... | G06F 17/2735 704/2 |
| 2008/0216060 A1 * | 9/2008 | Vargas | ....................... | G06F 8/51 717/137 |
| 2009/0281789 A1 * | 11/2009 | Waibel | ................ | G06F 17/2735 704/3 |
| 2011/0202874 A1 * | 8/2011 | Ramer | .............. | G06F 17/30398 715/810 |
| 2012/0035907 A1 * | 2/2012 | Lebeau | .................... | G06F 17/28 704/2 |
| 2013/0129058 A1 * | 5/2013 | Kelly | ....................... | H04M 1/64 379/88.01 |
| 2013/0346061 A1 * | 12/2013 | Donabedian | .......... | G06F 17/289 704/2 |
| 2014/0109046 A1 * | 4/2014 | Hirsch | ....................... | G06F 9/44 717/120 |
| 2014/0109066 A1 * | 4/2014 | Dhanda | ..................... | G06F 8/65 717/131 |
| 2014/0214398 A1 * | 7/2014 | Sanders | .............. | G06F 17/2863 704/3 |
| 2015/0082273 A1 * | 3/2015 | Torok | ........................ | G06F 8/34 717/109 |
| 2015/0128106 A1 * | 5/2015 | Halley | ...................... | G06F 8/41 717/106 |
| 2016/0147744 A1 * | 5/2016 | Wang | .................. | G06F 17/2854 704/277 |

* cited by examiner

Primary Examiner — Chameli Das

(57) ABSTRACT

Methods for correcting inaccurate translation of words or phrases in a mobile app, by users of that mobile app, in which those users can invoke an alternate "correction" function in the mobile app. The correction function allows users of the mobile app to send messages back to a programmer of the mobile app, including alternative translations, comments on translations, connotations of those translations, and other meaning associated with those translations. Edits made by users can be counted, or otherwise statistically measured, to determine a most-popular translation associated with the original text from the mobile app.

19 Claims, 3 Drawing Sheets

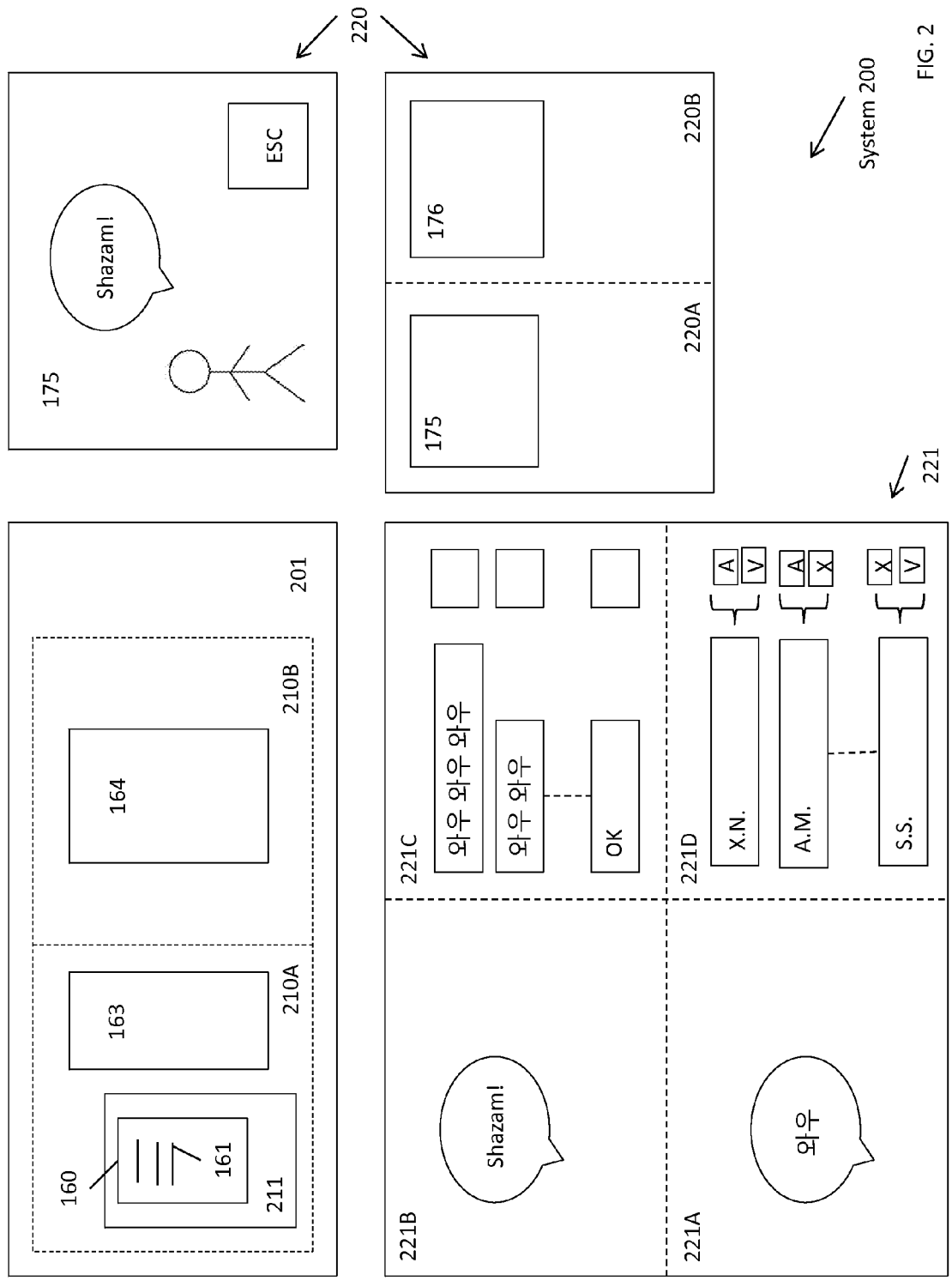

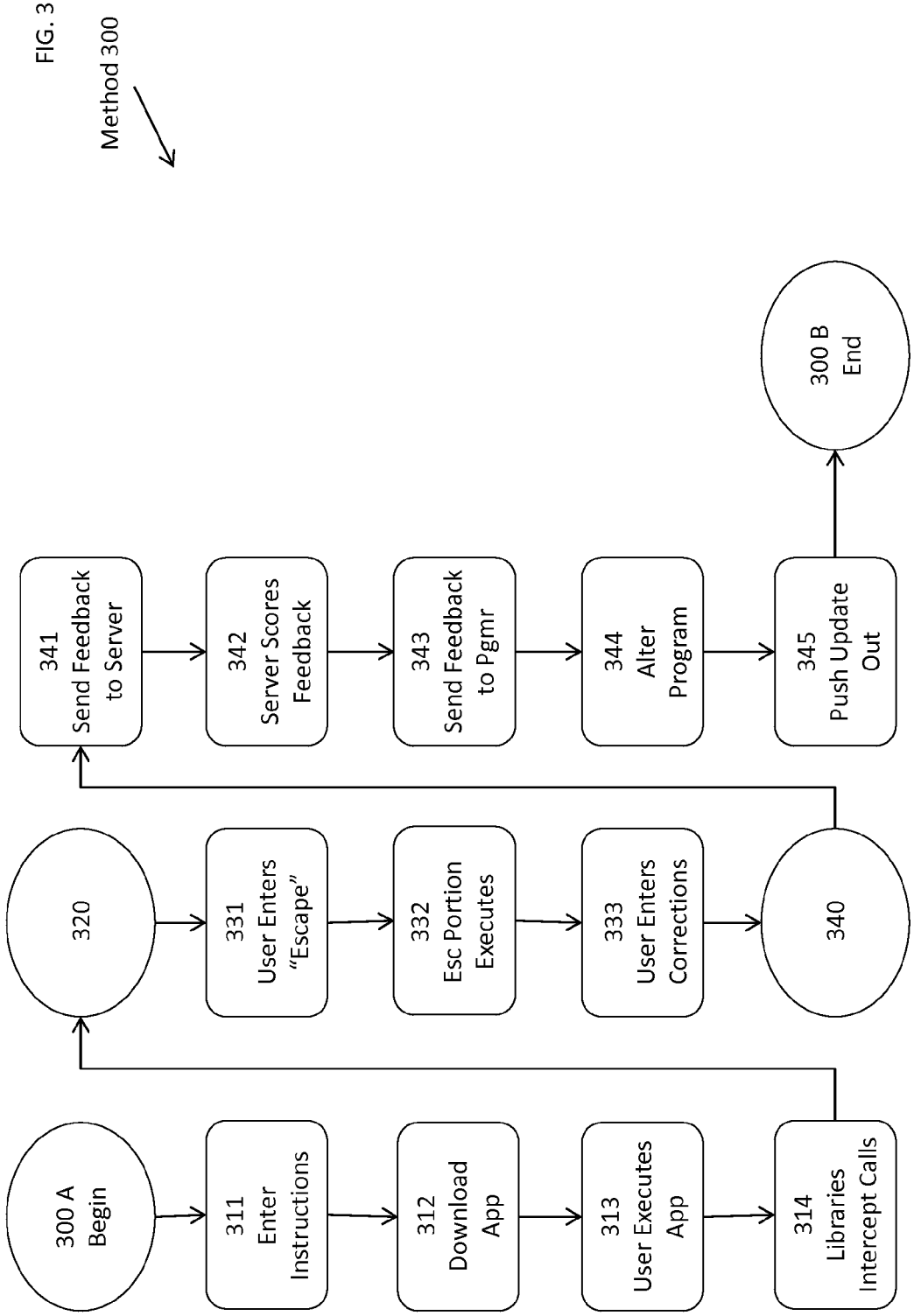

USER CORRECTIONS IN TRANSLATION

BACKGROUND

1. Field of the Disclosure

This application generally relates to translation and other matters.

2. Background of the Disclosure

The computing power of hand-held (as well as wearable, implantable, and other) devices makes it possible to write programs of instructions for those devices that display information in various different ways. These can include text, drawings, still photos, animation, movies, and otherwise. Inclusion of text (or figures displaying text) can lead to the problem of a difference in meaning between what the programmer of the instructions intends that text to mean, and what the reader understands that text to mean. While this can occur for any written material, the problem is particularly acute when there is more than one (natural, human) language involved.

One known solution is to provide more than one variant of the text or figures displayed by the program (sometimes called an "application" or an "app"), such as an English version and a Spanish version. In such cases, the program could be written in a language most easily understood by the programmer, with values used by the program to display text or figures of meaning to the user. Some programs use a technique known as "localization", in which a single program can provide text and figures in multiple languages, as well as settings that determine what language to display the text, is collected in a standardized data structure. These settings can be fixed by the programmer, fixed at an initialization time by the program, or alterable by users from time to time. Other programs simply embed the text or figures as fixed constants in the instruction code, which is initially easier for the programmer, but can lead to greater difficulty when modifying or expanding the program later.

It sometimes occurs that translation of a snippet of text from one language to another can be very difficult. Often, the process requires a skilled translator, which can be expensive. Some languages have grammatical irregularities or idioms, and some words in some languages can acquire idiomatic or slang meanings, that would elude nearly everyone except those who are designing or using the program. Similarly, some words can have distinct meanings in different contexts, or multiple words can have the same or very similar meanings, again depending on context. For a first example, the English word hot can have at least four different meanings: temperature of an object, spicy food, indication of the weather, sexual appeal, each represented by a different Spanish word. For a second example, the English word charge can refer to a bank charge, a cavalry charge, a criminal charge, or an electrical charge, among other possibilities. It is quite possible that, in another language, each of these meanings will have a different word to express it.

One known solution is for the programmer to provide a list of textual words or phrases for the translator to convert into the other language. While this method can generally achieve the purpose of substituting one word for another, or one phrase for another, it is subject to some drawbacks. For example, since the programmer often does not have a working knowledge of the target language, it can sometimes occur that small changes to the program result in substantial changes in meaning of the translated version, which is generally undesirable.

Despite all the effort that might be put into accuracy, it sometimes occurs that one or more of the translations of words and phrases used by the program are not accurate, do not have the proper shade of meaning, or have a secondary meaning (such as a slang meaning) that is inappropriate. Even a skilled translator might miss slang and off-color meanings that are used in a subset of the population of people who use that language. It also sometimes occurs that words or phrases change in meaning among the population of people who use that language, possibly unpredictably, and possibly over relatively short periods of time. At least some users of the program are likely to notice this, but there is no convenient way for those users to communicate this information back to the programmers who created, or are maintaining, the program.

Each of these examples, as well as other possible considerations, can cause difficulty in aspects of translating a program from one language to another (or even from one regional dialect of a language to another), no matter what type of computer that translation is for (that is, whether that program is operating on a mainframe, a minicomputer, a desktop computer, a laptop computer, a tablet computer or display, a handheld computer or portable media device or telephone, a wearable computing device, an implantable computing device, or otherwise).

BRIEF SUMMARY OF THE DISCLOSURE

This application provides apparatuses and techniques that enable correction of inaccurate or inappropriate words and phrases users can find in a translated program, without requiring undue efforts by those users to contact the programmers with that information.

In one embodiment, a user of the program is able to open a line of communication back to the programmer, with the effect that the user is able to inform the programmer of any inaccurate or inappropriate words or phrases that user has found in a translated program. The line of communication does not require the user to know where, or even who, the programmer is.

In such embodiments, the application provides a technique by which the user can edit the words displayed by the program, replacing mistranslated words or phrases with replacements that are more accurate or more appropriate. Moreover, the user need not have any particular programming skill, any knowledge of how to contact the programmer, or any knowledge of the programmer's native language (so as to explain the user's reasoning behind the suggested changes). In one embodiment, the user can simply edit the words on screen.

In one embodiment, the application provides a technique by which the user's edits and suggested changes of the original translation from its source-language (a natural, human language) to a target-language (another natural, human language) are communicated to the programmer. For example, the user's edits and suggested changes can be packaged in a standard internationalization data structure (and optionally incorporated into that data structure in the original program, such as upon approval by the programmer), or more simply as a list or spreadsheet of replacements of mistranslated words and phrases with replacements and suggestions. In one embodiment, edits and suggested changes can each be accompanied with an explanation by the user, communicating to the programmer the reason for making the edit or change. In one embodiment, moreover, edits and suggested changes that are agreed to by multiple users can each have a "vote" count associated therewith, with the effect that the programmer can obtain a sense of the vox populi with respect to that translation.

In one embodiment, a correction assistant is added to the program, with the property that, when the correction assistant is active, the regular program instructions are not executed; instead the user is afforded the opportunity to make corrections and suggestions for improvement. The user's corrections and suggestions can be made onscreen on the hand-held or wearable device, if the program is being executed on such a device, or (optionally) can be made on a secondary device, such as a desktop, laptop, or tablet device. Moreover, in one embodiment, if the program is being executed on a handheld device, that device can be coupled to a device with a larger display (such as a laptop) and the larger display can be used to implement a user interface for the correction assistant.

For a first example, the communication assistant can offer the user the opportunity to suggest corrections or other edits, and to add comments describing why those corrections are superior. For a second example, the communication assistant can show the user what the screen would look like with the suggested corrections or other edits (without actually changing the program to make this a reality). For a third example, with sufficient screen space, the communication assistant can show the screen concurrently both with and without the suggested corrections. For a fourth example, the communication assistant can present suggestions made by other users, and offer the user the opportunity to select one to promote, such as by "voting" for it. Moreover, in one embodiment, a reputation management system can allow other users to rate, for reliability or quality, those users who suggest corrections or other edits.

In one embodiment, the application provides a technique by which the suggested target-language text provided by the suggesting user can be asked about by the programmer. The programmer can receive the user's suggested text or other corrections, and send a message to the individual device from which that suggestion originated. Optionally, the user can provide contact information, and the programmer can telephone or otherwise contact the user. (Of course, if the device from which that suggestion originated was in fact a telephone, the programmer might not need to ask for that information.)

In one embodiment, the communication assistant can allow the user to make suggestions about one or more other types of presentations by the program, such as presenting still pictures, animation, video, sound, or otherwise. Similarly, in this aspect, an embodiment of the communication assistant can be used to assist with translation other than from one natural, human source-language to another natural, human target-language. For a first example, the communication assistant can be used to assist in translation from a relatively higher grade reading level to a relatively lower grade reading level, so as to make written material available to a wider audience. For a second example, the communication assistant can be used to assist in translation from a set of parentally-controlled words to a set of child-appropriate words.

After reading this application, those skilled in the art would recognize that techniques shown in this application are applicable to more than just the specific embodiments shown herein. For a first example, suggestions could be replaced or augmented with suggestions that are replaced or augmented with translation of gestures or facial expressions. For a second example, suggestions could relate to other aspects of information being given out by the program, such as changes in grammar, factual corrections, and changes to the style of writing.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 2 shows a conceptual drawing of a user interface.
FIG. 3 shows a conceptual drawing of a method.

DETAILED DESCRIPTION

Translation and Correction System

Figure 1:
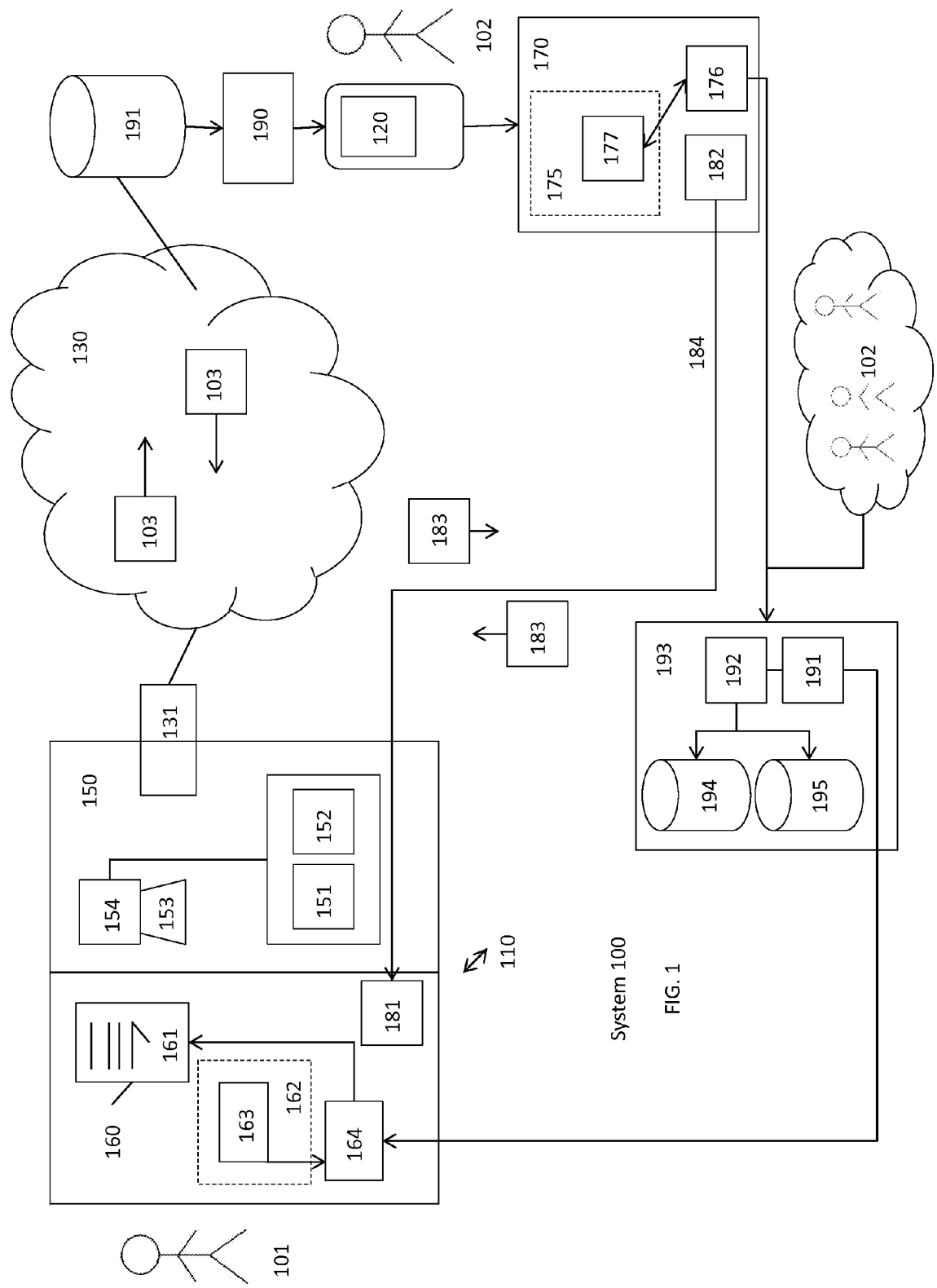
FIG. 1 shows a conceptual drawing of a system.

FIG. 1 shows a conceptual drawing of a system.

Programmer Workstation. A system 100 includes elements shown in the figure, including at least a programmer workstation 110 disposed to be used by a programmer 101 or other user, a user device 120 disposed to be used by a user 102, and one or more communication links 130 disposed to carry messages 103 to and fro between the programmer workstation no and the user device 120. The system 100 can also include other elements, whether or not shown in the figure, otherwise mentioned herein, or otherwise known in the art. For example, the system 100 can include a monitoring workstation (not shown) disposed to monitor operation of the system 100, and (optionally) to accept commands from, and provide responses to, one or more network operators or remote devices (not shown).

The programmer workstation no can be disposed for operation by one or more programmers 101 or other users, such as programmers, software designers, graphic artists, operators, other individuals or collections of people (whether operating locally or remotely), or by other automated devices or programs suited for controlling the programmer workstation 110. The programmer workstation no can include a programmer computing device 150, such as one including a processor 151, memory or mass storage 152 maintaining instructions and data, one or more input elements 153, and one or more output elements 154. The computing device 150 can also include other elements, whether or not shown in the figure, otherwise mentioned herein, or otherwise known in the art.

The input elements 153 can include one or more keyboards, mice or other pointing devices or pressure elements, touchpads, or other devices, such as devices capable of recognizing facial expressions, fingerprints, gestures, speech, or other possible inputs. The output elements 154 can include one or more displays or monitors, lamps, speakers, touchpads, or other devices, such as devices capable of presenting electrical, haptic, olfactory, or other possible outputs.

The programmer workstation no can include a copy of the program 160, including a copy of its instructions 161, an emulator 162 presenting the instructions 161 with a virtual copy of a hand-held device or other device on which those instructions 161 are disposed to be executed (such as an iPhone™, an iPad™, or a Google Glass™device), and one or more programmer representations 163 of one or more screen views presented by the instructions 161 when those instructions 161 are executed. The programmer workstation 110 can also include one or more alternative programmer representations 164 of one or more screen views that would be presented by the instructions 161 when those instructions 161 are executed, if those instructions 161 were to make their presentation in another (natural, human) language.

Modified Library. The instructions can include one or more program instruction libraries, which can be called upon by the program to perform standard functions, such as writing to the display or screen (or other attempts by the app to change the screen image). In some embodiments, the library including the screen-writing function is protected from program trickery by the operating system, while in other embodiments, that library can be exposed to manipulation by the programmer using the instructions 161. In either case, the library can be modified to include a modified screen-writing function, as described herein.

Each time one of these intercepted functions is called, the modified program libraries capture the content of the (emulated) screen, which includes all information describing how text (or any other presentation from the device, such as audio, video, haptic output, or otherwise) appears on the screen (or, if not "on the screen", such as with audio, is experienced by the user), and which includes all information describing what text that is. For example, if the app writes a speech balloon on the screen, and inside that speech balloon writes the English word "hot!," the modified program libraries capture that information, including the background color, border color and thickness, location, shape, size, and other features of the speech balloon, and the font, position, punctuation, size, text, and other features of the words written in the speech balloon.

Each time the modified program libraries capture information about modifications to the screen, the modified program libraries generate a description of the screen, in a comparatively simple page description language. The page description language can include HTML or a variant thereof. The page description language can be selected to be simple enough that a relatively simple program (compared to the programmer's coding environment for computer-readable language) can render an exact copy of the screen that would have been generated by the app if it were actually being executed on a hand-held device such as an iPhone™ or iPad™, or a wearable device such as Google Glass™ or an iWatch™.

This can have the effect that each time the screen is changed by the (emulated) app, the program libraries generate a description of the new screen, in the page description language. This can have the effect that the page description language can be sent to the user device 120, which can render a substantially exact copy of the screen image, without having to include any copies of the programmer's coding language environment, or any copies of the programmer's actual instructions 161 that generate that screen image, as described herein. This can also have the effect that the user device 120 can include relatively inexpensive hardware and software, since it does not have to include the programmer's coding language environment or the modified program libraries.

Alternative: Modified Emulator. The emulator 162 can include a standard emulator for such programs 160, such as the emulator supplied by Apple, Inc. for emulating an app (a program 160) to execute under control of the iOS™ operating system on hand-held devices such as the iPhone™ and iPad™, or an emulator provided by another source. In alternative embodiments, the program instruction libraries are not necessarily modified, but instead, the emulator 162 itself can be modified, in lieu of or in addition to, modifications to the program instruction libraries. The (modified) emulator 162 can include a modification to one of those standard emulators, which differs by intercepting attempts by the app to change the screen image. For example, the modified emulator 162 can intercept the functions for string-lookup and for writing text to the screen, similar to described above regarding the program libraries.

In such alternative embodiments, similarly, each time one of these intercepted functions is called, the modified emulator 162 captures the content of the (emulated) screen, which includes all information describing how text appears on the screen, and which includes all information describing what text that is. Again, for example, if the app writes a speech balloon on the screen, and inside that speech balloon writes the English word "hot!," the modified emulator 162 captures that information, including the background color, border color and thickness, location, shape, size, and other features of the speech balloon, and the font, position, punctuation, size, text, and other features of the words written in the speech balloon.

In such alternative embodiments, similarly, each time the modified emulator 162 captures information about modifications to the screen, the modified emulator 162 generates a description of the screen, in a comparatively simple page description language. Similar to noted above, the page description language can include HTML or a variant thereof. Also similar to noted above, the page description language can be selected to be simple enough that a relatively simple program (compared to the programmer's coding language environment) can render an exact copy of the screen that would have been generated by the app if it were actually being executed on a hand-held device such as an iPhone™ or iPad™.

Similar to described above, this can have the effect that each time the screen is changed by the (emulated) app, the modified emulator 162 generates a description of the new screen, in the page description language. Also similarly, this can have the effect that the page description language can be sent to the user device 120, which can render a substantially exact copy of the screen image, without having to include any copies of the programmer's coding language environment, or any copies of the programmer's actual instructions 161 that generate that screen image, as described herein. Also similarly, this can also have the effect that the user device 120 can include relatively inexpensive hardware and software, since it does not have to include the programmer's coding language environment or the modified emulator 162.

User Device. Similarly, the user device 120 can be disposed for operation by one or more users 102, such as individuals or collections of people (whether operating locally or remotely), or by other automated devices or programs suited for controlling the user device 120. The user device 120 can include a smartphone (such as an iPhone™) or other hand-held (such as an iPad™) or wearable device (such as Google Glass™). The user device 120 can also be coupled to another user computing device 170, which is similar to the programmer workstation no, at least in that it includes a processor (not shown), memory or mass storage (not shown) maintaining instructions and data, one or more input elements (not shown), and one or more output elements (not shown). Similarly, the user computing device 170 can also include other elements, whether or not shown in the figure, otherwise mentioned herein, or otherwise known in the art.

Similarly, the user device 120 can include one or more user representations 175 of one or more screen views presented by the user device 120 when that device is operated normally by the program 160. Similarly, the user device 120 can also include one or more alternative representations 176 of one or more screen views presented by the user device 120 when that device is operated according to the escape sequence (as described herein).

The user device 120 can receive the program 160 (in its compiled form, the application or "app"), from a distribution server 190. The distribution server 190 maintains such programs 160 in a database 191, either at the same site, or a database 191 it has access to, such as by means of the communication link 130. The distribution server 190 can also handle any desired business transactions associated with distributing the app, such as payment by the user 102, or otherwise.

Modified Renderer. The user device 120 can include a standard page renderer 177, such as any of the web browsers Chrome™ by Google, Inc., Firefox™ by the Mozilla Foundation, or Safari™ by Apple, Inc. The renderer 177 can include a modification to one of those standard renderers, which differs by allowing the user 102 to enter an "escape sequence", such as a preselected particular gesture at a preselected location of the screen, or a preselected sequence of typed keys in combination with a preselected gesture, or selection of a button or icon indicating the escape sequence. When the user 102 enters the escape sequence, the (modified) renderer 177 segues from ordinary operation of the program 160 into a correction mode. In the correction mode, the user 102 can use the renderer 177 in combination with a form-filling program, which can, as described herein, allow the translator 102 to identify word or phrases, or images, and indicate corrections to the translations thereof.

This can have the effect that the user 102 can alter the words in the screen image from their original translation from the (natural, human) source language (such as English) to the (natural, human) target language (such as Spanish). The renderer 177 can also allow the user 102 to see the effects of their translation on the screen image. The renderer 177 can also allow the user 102 to page back and forth among the screen images generated by the program 160 in the order they were generated.

In one embodiment, the renderer 177 can access a database of suggested changes 192, and present those suggested changes to the user 102 when entering the escape mode. The database can be maintained anywhere the user device 102 can obtain access thereto, such as the programmer workstation no, or alternatively, another device coupled to the communication link 130. For example, the suggested changes 192 can be maintained at crowdsourcing manager 193, which can also include a database of user reputations (for reliability of corrections) 194, a computing device including suitable instructions 195 to score suggestions made by the user 102 and by other users 102, and a computing device (possibly the same computing device) including suitable instructions 196 to send accepted suggestions to the programmer 101.

In embodiments including suggested changes 192 from other users 102, the renderer 177 can allow the user 102 to select one of those earlier-suggested changes, effectively "voting" for a preferred change. The renderer 177 can even present the user with a current total of such votes, possibly including an option to vote for (and a total vote so far for) "no change, the translation is already correct".

This can have the effect that the user 102 and other users 102 can collectively alter the words in the screen image from their original translation from the source language (such as English) to the target language (such as Spanish), using a concept sometimes referred to as "crowdsourcing", or as the "Delphi effect", in which some others have shown that a group of people are more likely, than any individual in the group, to answer a question correctly, when their individual answers are aggregated.

In one embodiment, this crowdsourcing effect can be augmented by maintaining a reputation management system. In such embodiments, particular individual users 102 (or particular known groups of users 102, when that can be determined) can have their suggestions rated by other users 102, with the effect that some users 102 can become known to the community as being experts, or lucky, or for whatever reason more likely, to make the suggested change ultimately deemed "correct" by the community of users 102. In such embodiments, particular suggestions can be tagged, in lieu of or in addition to the total, with an aggregation (statistical or otherwise) of the reputations of the users 102 who favor that alternative. For example, the user device 120 can tag each suggestion with the reputation value of the "best" user 102 (so far) who favors that alternative, or with the total reputation values of all users 102 (so far) who favor that alternative, or otherwise.

Each time the user 102 alters the screen image, such as correcting the words shown on the screen image from a poorer to a better translation into the target language, the renderer 177 can generate a description of the modified screen, in the page description language. Alternatively, the renderer 177 may generate a description in some other description language sufficient to describe the changes, or to describe the new screen. The renderer 177 can generate a separate version of the screen showing the changes, while preserving the original version of the screen. Alternatively, the renderer 177 may allow the user 102 to make the changes on the version of the screen image it was sent.

The user devices 120 can send one or more messages 103 to the programmer workstation no, describing the changes made by users 102. The users' devices 120 may send these messages in real time, as the users 102 make changes, or can wait until the users 102 direct their user devices 120 to send their changed screen images to the programmer workstation no. The programmer workstation no can either (A) show the changes to the programmer 101, allowing the programmer 101 to modify the program 160 as desired, or (B) modify the program 160 automatically. For example, if the program 160 includes a standard localization resource, the programmer workstation no can use the users' changes to modify the localization. (In practice, the programmer 101 likely would at least wish to check that the suggested change is not a prank.)

Communication. The programmer workstation no can also be disposed for control of a programmer communication interface 131, such as a wireless network interface coupled to the communication link 130 and controlled by the processor 151. The communication link 130 can include a switched connection, such as a satellite link or a telephone line, or can include a networked connection, such as a computer network (whether a LAN, WAN, or other type of network), or can provide another form of communication to and fro between the programmer workstation no and the user device 120.

The programmer workstation no can send messages 103 to the user device 120 and receive messages 103 from the user device 120, such as messages in a communication protocol described herein (or another communication protocol), using the programmer communication interface 131. The programmer workstation no can construct those messages 103 to include information describing those one or more representations 163 of screen views that would be presented by the instructions 161 when those instructions

161 are executed. The programmer workstation 110 can send those messages 103, using the communication interface 131 and the communication link 130, to the user device 120, which can receive those messages 103.

Similarly, the user device 120 can also be disposed for control of a user communication interface 180, such as a wireless network interface (it is expected that the user device 120 would be a smartphone) possibly coupled to the communication link 130, or possibly coupled to a public switched telephone network (PSTN) and controlled by a processor at the user device 120. The user device 120 can receive messages 103 from the programmer workstation 110 and send messages 103 to the programmer workstation 110, such as messages in the communication protocol described herein (or another communication protocol), using the user communication interface 180.

Alternatively, the programmer 101 and the user 102 may also communicate using alternative techniques. For example, the programmer 101 may simply telephone the user 102 at the user device 120, whenever the user device 120 includes a smartphone. Also alternatively, the programmer 101 and the user 102 may exchange information using email, instant messaging, SMS and MMS messages, videoconferencing, or otherwise.

Alternative Messaging. The programmer workstation 110, user device 120, and communication link 130 can facilitate communication between the programmer 101 and the user 102 by providing a programmer messaging window 181 that can be shown at the programmer workstation 110, a user messaging window 182 that can be shown at the user device 120, and a type of "direct communication" message 183 that can be sent using the communication link 130 to or fro between the programmer workstation 110 and the user device 120. The programmer messaging window 181 and the user messaging window 182 can be used to send text, sound, video, or other types of information. This would be valuable in the event that the programmer 101 desires to communicate with the user 102 in real time.

User Interfaces

FIG. 2 shows a conceptual drawing of a user interface.

The programmer workstation 110 can be disposed to present a programmer user interface (UI) 201. The programmer 101 can use the programmer UI 201 to interact with the system 100. The user device 120 can be disposed to present a user UI 202. The user 102 can use the user UI 202 to interact with the system 100. As described herein, the programmer 101 can use the programmer UI 201, and the user 102 can also use the user UI 202 to interact with each other.

Programmer UI. The programmer UI 201 includes a programmer display 210, which can include a first portion 210a and a second portion 210b. There is no particular requirement that the first portion 210a and the second portion 210b are in separate parts of the programmer display 210. For example, the programmer UI 201 can include elements described herein as the first portion 210a and elements described herein as the second portion 210b can be intermixed and, where practical, overlapping.

The first portion 210a can include a presentation of an integrated development environment (IDE) 211. The IDE 211 can include a presentation of the program 160, including a set (or subset) of the program's instructions 161, and one or more of the programmer representations 163 of one or more screen views presented by the instructions 161 when those instructions 161 are executed. This has the effect that the programmer 101 can see the changes in screen images that would be presented in response to changes in the program 160.

The second portion 210b of the programmer display 210 can include the alternative programmer representations 164 (in the target language) of one or more screen views, each having a corresponding one of the programmer representations 163 (in the source language). The alternative programmer representations 164 are responsive to actions by the user 102, as described herein. The alternative programmer representations 164 represent the screen images that would be presented by the instructions 161 when those instructions 161 are executed, if those instructions 161 were to make their presentation in the target language (either as originally designed, or as indicated by a translator). This can have the effect that the programmer 101 can see the screen images that would be presented in each language, concurrently, using the programmer representation 163 and the alternative programmer representation 164. This can have the effect that the programmer 101 can see if the screen images differ so much in presentation that the translation afforded by the alternative programmer representation 164 might need alteration.

User UI. The user UI 202 uses the user device display 220, which can include a first sequence of screen renderings for normal operation of the program 160, and a second sequence of screen renderings for the escape sequence. Alternatively, the user device display 220 may include a first portion 220a and a second portion 220b, but this is only likely, in view of the relatively smaller size of the user device display 220, when the user device 120 is coupled to an additional display.

In one embodiment, when the user 102 uses the escape sequence and enters the modified portion of the program 160 that allows the user 102 to suggest modifications, explain reasoning for those modifications, or possibly to vote for modifications suggested by other users 102 and to rate other users 102 on their reliability at making good suggested modifications. For example, the user UI 202 can include an escape screen 221, which can be used by the user 102 to enter a suggested modification (such as at a screen location 221a), enter an explanation of that suggested modification (such as at a screen location 221b), vote for a modification suggested by another user 102 (such as at a screen location 221c), and rate other users 102 on their reliability at making good suggestions (such as at a screen location 221d).

In alternative embodiments in which the user UI 202 includes a first portion 220a and a second portion 220b, similar to the programmer UI 201, the first portion 220a may include the one or more originally-translated presentations 175 of one or more of the screen views presented by the renderer 177. As described herein, each one of the originally-translated presentations 175 may be constructed by the renderer 177 in response to the page description language version of the corresponding screen view.

Again similarly to those alternative embodiments in which the user UI 202 includes a first portion 220a and a second portion 220b, the second portion 220b may include one or more user-modified presentations 176 of one or more of the screen views presented by the renderer 177. As described herein, the user-modified presentations 176 may include screen elements from one or more of the screen views presented by the renderer 177, but with user-modified words or phrases in the target language substituted for originally-translated words or phrases in the target language.

When the page description language is HTML or a variant thereof, the user 102 can edit the text identified by the page description language using a relatively simple "form" editor, in which the user 102 can fill in a blanks each associated with a correctable word or phrase, or image. For example, the user device 120 can include a standard HTML editor, modified so that changes made by the user 102 to one or more of the originally-translated presentations 175 are reflected, not in the presentations 175 themselves, but each in their corresponding user-modified presentations 176. This has the effect that the user 102 can see both the originally-translated presentations 175 (in the original translation into the target language) and the corresponding user-modified presentations 176 (in the user-modified translation into the target language) concurrently.

Interaction Between Programmer and User. As described herein, when the user 102 makes suggested changes to one or more of the originally-translated presentations 175, which are reflected in the corresponding user-modified presentations 176, those changes can be seen by the programmer 101 at the programmer's workstation no in the second portion 210b thereof, as one or more changes between one or more of the programmer representation 163 (as originally translated into the target language) and their corresponding user-suggested representation 164.

When the programmer 101 makes changes to the program 160, those changes cause consequent changes in one or more of the programmer representations 163 (in the source language). This has the effect of causing changes in the corresponding translator representations 175 (in the source language). If and when the user 102 re-downloads and re-installs the program 160, those changes are reflected in the normal operation of the program 160.

This can occur in embodiments in which the programmer 101 is presented with the suggested changes and they were not automatically made to the localization portion of the program 160. In embodiments in which the users' changes actually were automatically made to the localization portion of the program 160, the programmer 101 can be presented with a visualization of those changes using one or more of the alternative programmer representations 164.

If the programmer 101 disagrees with, or has questions about, the user-suggested modifications, the programmer 101 can contact the user 102 as described above, such as either (A) facilitated by the system, as described herein, or (B) using another communication technique, such as a telephone call or other person-to-person communication technique. This has the effect that the programmer 101 can ask the user 102 for further explanation of their suggested changes, and that the user 102 (if contacted by the programmer 101) can ask for the intended meaning of any ambiguous words or phrases, and can make one or more appropriate suggested modifications, if any are needed.

Method of Using Suggested Translation System

FIG. 3 shows a conceptual drawing of a method.

A method 300 can be performed by the system 100, the programmer 101, the user 102, or combinations thereof. The method 300 can include flow points and steps. Where described herein that a flow point is reached, or that a step is performed, by the method 300, it should be understood from context (or from the figure) which portion of the system 100, or alternatively the programmer 101 or the translator 102, takes the specific actions described for that flow point or step.

Although the flow points and steps are shown in a particular order, in the context of the invention, there is no reason for any such limitation. The flow points or steps may be performed in a different order, or may be performed in a parallel or pipelined manner, or otherwise.

Beginning of Method. A flow point 300A indicates a beginning of the method 300.

Initial Setup and Use. At a step 311, the programmer 101 enters instructions 161 in the coding (computer-readable) language environment for the program 160. The programmer workstation no can show the instructions 161 to the programmer 101 in a format that allows for ease of code construction, ease of editing, ease of detecting errors, or other factors. The coding (computer-readable) language environment includes an integrated development environment (IDE).

The programmer can execute the instructions, such as using an emulator, using the IDE. This IDE preferably, but need not necessarily, use a modified set of libraries that determine whenever there is output designated for the user. The modified libraries could be standard libraries supplied by the development environment to programmers using the IDE, but for purposes of this description modified libraries include all computer code that determines whenever there is output designated for the user. This can include text strings, which are primarily described herein, but in the context of the invention, there is no particular requirement for any such limitation. For example, output for presentation to the user can include still pictures that include textual or symbolic elements, or can include audio, video, haptic output (including buzzing or vibration), otherwise, or combinations or conjunctions thereof.

The modified libraries can maintain a set of checkpoints for the program, from the viewpoint of what output is presented to the user, and maintain a description of that output. For example, if the screen shows the English word "hot", the modified libraries can note that the program has entered the state (or a specific one of several states) in which the program presents that text on the screen display. Concurrently, the modified libraries can record a description of the program output, in such form that it can be repeated, even without conducting a Byzantine tour of the program.

For example, using the IDE (or otherwise), the programmer can notice bugs or other errors in the program instructions, and can correct them. At some point, the programmer can decide that the app is ready for publication, that is, ready for download and use.

When the app is ready for publication to user devices 120, it is configured to use the modified libraries, and to use a routine that can identify and act on a user "escape sequence" at a user device 120.

There are several different ways this can be accomplished: (A) A software tool at the IDE can read the program instructions themselves, that is, the computer source code, to determine a set of checkpoints and page descriptions at those checkpoints. (B) A different software tool at the IDE can read the program instructions after the program has been compiled, that is, the computer object code, to determine the set of checkpoints and page descriptions associated with those checkpoints. (C) The modified libraries themselves, or a modified emulator, —in a version implemented at the IDE—can identify the checkpoints and determine the page descriptions at those checkpoints, such as in response to executing the app in an emulator, sandbox, or virtual machine. (D) Some other technique, or some combination or conjunction of techniques, can be used.

When the programmer concludes that the app is ready for publication to user devices 120, the app (before publication) is configured with the modified libraries and with an escape sequence. As noted above, the modified libraries can identify the checkpoints and determine the page descriptions at those checkpoints, when the app is executing at user devices 120.

The escape sequence can include one or more of a gesture, a text input, or one or more taps at designated points on the screen (all to be performed at the user device 120), which are deemed unlikely to occur without purpose. The modified app is then ready for download by one or more users to their associated user device 120.

At a step 312, the user downloads the app to their user device 120. Typically, the user requests the app from a download server, such as a digital goods store, but in the context of the invention, there is no particular requirement for any such limitation.

At some time thereafter, at a step 313, the user invokes the app at the user device 120, either by deliberately starting it, or because its initiation is associated with some other trigger at the user's device. For example, the app might be triggered to start at the user device 120 whenever the user shakes the hand-held user device 120.

At a step 314, the app begins execution at the user device 120, and proceeds through each of its checkpoints, receiving (optional) inputs and making presentations at the user device 120 to the user. As a part of this step, the app, in response to instructions originally written by the programmer and now incorporated into the app, might attempt to change the screen image at the user device 120. For example, the app might attempt to write text or images to the screen at the user device 120. In such cases, the modified libraries (which have been downloaded to the user device 120 with the app by the download server) intercept that attempt, and record the checkpoint for the individual instance of the app at the user device 120, while the app itself can generate the presentation at the user device 120.

As part of this step, the modified program libraries (or modified emulator 162) can notice the system call at the user device 120 and modify their record of what state the individual instance of the app is in at the user device 120, and what images and text individual instance of the app is displaying on the screen at the user device 120. This can include a set of text strings in the target (human, natural) language that appear when the individual instance of app is in that state at the user device 120.

At some time thereafter, at a flow point 320, the user might desire to escape from normal operation of the individual instance of the app at the user device 120, and to upload a corrected translation (or another message to the programmer about the collection of symbols and text), or otherwise correct a translation error.

User Feedback. At a step 331, the user 102 enters the escape sequence, such as a special gesture, or a gesture combined with a special set of keys, or a location on screen to indicate an escape. In the figure, a button with the term "ESC" is shown, but in the context of the invention, there is no particular reason for any such limitation.

At a step 332, the escape portion of the program 160 takes over, and presents the user 102 with a correction UI 221 (or an alternative correction UI 220).

At a step 333, the user 102 can (optionally) enter a corrected translation, such as shown in the portion of the screen 221*a*, and an explanation thereof, such as shown in the portion of the screen 221*b*. Alternatively, or as part of this step, the user 102 can (optionally) select an already-correct translation, such as shown in the portion of the screen 221C, and can (optionally) vote for a preferred expert on this translation, such as shown in the portion of the screen 221*d*.

As part of this step, the escape portion of the program 160 can present several possibilities, such as the top three suggestions, allowing the user 102 to select among them. One of those several possibilities can (optionally) be an indicator that the translation really is acceptable already, which the user 102 might notice after seeing the alternatives that other users 102 have suggested.

As part of this step, the escape portion of the program 160 can present several possible other users 102 whose reliability the user 102 can vote up/down. (Only initials are shown in the figure, but in the context of the invention, there is no requirement for any such limitation.) Alternatively, the escape portion of the program 160 can indicate that the user's 102 selection of most accurate translation indicates that the user 102 also thinks those who agree are more reliable than those who do not agree.

At a flow point 340, the user device 120 is ready to provide feedback, with respect to corrections, to the programmer workstation 101.

Aggregated Feedback. At a step 351, the user device 120 sends the information it has gleaned back to the correction management server 193.

At a step 352, the correction management server 193 scores the feedback received from the user 102 (such as possibly adjusting it in view of the user's reliability score as measured by other users 102), and aggregates the user's feedback with feedback from other users 102. For example, in one embodiment, the correction management server 193 can simply count the unweighted or weighted total of users 102 each suggesting a particular correction. As part of this step, the correction management server 193 also adjusts the reliability score of any users 102 whose reliability was evaluated.

At a step 353, the correction management server 193 sends the users' aggregated feedback back to the programmer workstation no, where the programmer 101 can evaluate that feedback. In one embodiment, the programmer 101 receives the suggested changes in the form of a message or other alert. In alternative embodiments, the programmer workstation 110 can automatically modify the localization of the program 160 in response to the feedback (optionally after confirming with the programmer 101 that the "correction" is not a prank).

At a step 354, the programmer 101 can decide to alter the program 160 in response to the feedback. For example, the programmer 101 can simply allow the feedback to be entered as localization data. Alternatively, the programmer 101 can contact one or more users 102 and ask for further information about their reasoning.

At a step 355, if the program 160 is altered, the programmer workstation 110 can push out the altered version of the program 160 to users 102. All users 102 then benefit from the correction made by one or more users 102.

End of Method. A flow point 300B indicates an end of the method 300. The method 300 repeats until both the programmer 101 and the translator 102 are satisfied with the result. Alternatively, the method 300 may repeat until some selected condition occurs.

Alternative Embodiments

Elements of the system are described herein with respect to one or more possible embodiments, and are not intended to be limiting in any way. In the context of the invention, there is the particular requirement for any such limitations as described with respect to any elements of the system. For example, individual elements of the system 100 could be replaced with substitutes that perform similar functions. Moreover, as described herein, many individual elements of the system are optional, and are not required for operation.

Although the one or more control elements of the system are described herein as being executed as if on a single computing device, in the context of the invention, there is no particular requirement for any such limitation. For example, the one or more control elements of the system can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A system, including
a mobile device, including a processor and memory maintaining instructions, the instructions being interpretable by the processor to present display elements having a first human-language meaning to a user of the mobile device;
a development device, including a development environment suitable to create an app by a designer or programmer, the app including at least some of the instructions, and suitable to distribute the app to the mobile device, the app including at least some of the instructions interpretable by the processor to present the display elements in a form having a second human-language meaning to the user;
the mobile device including a communication link responsive to one or more signals delivering the app to the mobile device, the communication link being responsive to the user and suitable to present messages regarding the second human-language meaning from the user to the designer or programmer, the messages including a relation between the second human-language meaning and the first human-language meaning;
the app including communication link being responsive to the user to send information to the developer or programmer;
the app including a first mode in which it performs a first designated function;
instructions executable or interpretable by the processor to receive a signal from the user when performing the first designated function, the signal directing the app to enter a state in which it performs a second designated function;
the second designated function including a user interface in which the app receives input from the user and communicates that input to the developer or programmer.

2. A system as in claim 1, wherein
the development device, in response to the messages, modifies the app by packaging at least some information from the messages in a localization data structure for the app.

3. A system as in claim 1, wherein
the development device, in response to the messages, packages at least some information from the messages in a pre-determined initialization data structure.

4. A system as in claim 1, wherein
the user communicates that input to the developer or programmer by editing on a screen of the mobile device.

5. A system as in claim 1, wherein
the user communicates that input to the developer or programmer by editing one or more display elements.

6. A system as in claim 1, wherein
the user communicates that input to the developer or programmer without any of:
entering a destination address for the developer or programmer;
knowing an identity for the developer or programmer;
knowing how information is delivered to the developer or programmer;
the user communicates that input to the developer or programmer by editing one or more display elements.

7. A system as in claim 1, wherein
the display elements include one or more of:
text, drawings, photographs, animation, video images.

8. A system as in claim 1, wherein
the messages include at least some information including commentary from the user to the developer or programmer.

9. A system as in claim 8, wherein
the commentary includes at least one of:
explanations with respect to the first human-language meaning;
explanations with respect to the second human-language meaning;
explanations with respect to possible users of the app.

10. A system as in claim 1, wherein the messages include one or more of:
changes, comments, corrections
regarding at least a portion of the relation between the second human-language meaning to the first human-language meaning.

11. A system as in claim 1, wherein the messages include one or more of:
inappropriate meaning, secondary meaning, slang, unintended meaning regarding at least a portion of the relation between the second human-language meaning to the first human-language meaning.

12. A system as in claim 1, wherein
the messages include one or more of:
secondary meanings, slang, unintended meanings
regarding at least a portion of the relation between the second human-language meaning to the first human-language meaning.

13. A system as in claim 1, wherein the mobile device includes one or more of:

a handheld device, a wearable device, an implantable device.

14. A system as in claim 1, including a second mobile device including a second communication link responsive to one or more second signals delivering the app to the second mobile device, the second communication link being responsive to a second user and suitable to present second messages regarding the second human-language meaning from the second user to the designer or programmer, the second messages including a second relation between the second human-language meaning and the first human-language meaning.

15. A system as in claim 14, wherein the development device, responsive to the first mobile device and the second mobile device determines a statistical measure of corrections to the second human-language meaning, and responsive to the statistical measure of corrections, and responsive to the user invoking the communication link, presents a set of suggested second human-language meanings to the first mobile device and the second mobile device.

16. A system as in claim 14, wherein the development device, responsive to the first mobile device and the second mobile device, determines a statistical measure of corrections to the second human-language meaning, and responsive to the statistical measure of corrections, modifies the app by packaging at least some information from the messages in a localization data structure for the app.

17. A system as in claim 14, wherein the development device, responsive to the first mobile device and the second mobile device, determines a statistical measure of corrections to the second human-language meaning, and responsive to the statistical measure of corrections, presents a new second human-language meaning to the developer or programmer.

18. A system as in claim 14, wherein the development device, responsive to the first mobile device and the second mobile device, determines a statistical measure of corrections to the second human-language meaning, and responsive to the statistical measure of corrections, presents a new second human-language meaning to the first mobile device and the second mobile device.

19. A system as in claim 14, wherein the statistical measure of corrections to the second human-language meaning includes a weighted average.

* * * * *